US007072539B2

United States Patent
Wu et al.

(10) Patent No.: US 7,072,539 B2
(45) Date of Patent: Jul. 4, 2006

(54) WAVELENGTH-SELECTIVE 1×N2 SWITCHES WITH TWO-DIMENSIONAL INPUT/OUTPUT FIBER ARRAYS

(75) Inventors: Ming-Chiang Wu, Orinda, CA (US); Jui-Che Tsai, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/053,182

(22) Filed: Feb. 7, 2005

(65) Prior Publication Data

US 2005/0213877 A1    Sep. 29, 2005

Related U.S. Application Data

(63) Continuation of application No. PCT/US03/17043, filed on May 30, 2003.

(60) Provisional application No. 60/402,387, filed on Aug. 8, 2002.

(51) Int. Cl.
*G02B 6/26* (2006.01)
(52) U.S. Cl. .............................. 385/18; 385/31; 385/47
(58) Field of Classification Search .................. 385/18
See application file for complete search history.

(56) References Cited

U.S. PATENT DOCUMENTS

| 6,097,859 | A | 8/2000 | Solgaard et al. |
| 6,263,127 | B1 | 7/2001 | Dragone et al. |
| 6,704,476 | B1 * | 3/2004 | Ford et al. .................... 385/18 |
| 2002/0071627 | A1 | 6/2002 | Smith et al. |
| 2002/0131698 | A1 | 9/2002 | Wilde |
| 2003/0043472 | A1 * | 3/2003 | Mandella .................... 359/641 |
| 2003/0048980 | A1 | 3/2003 | Hoen |

OTHER PUBLICATIONS

J.E. Ford et al., Wavelength Add-Drop Switching Using Tilting Micromirrors,: J. Light Technol., 17, 904-911 (1999).
D. Hah et al., "A Low Voltage, Large Scan Angle MEMS Micromirror Array with Hidden Vertical Comb-Drive Actuators for WDM Routers," 2002 Optical Fiber Communication (OFC) Conference, Anaheim, California, Mar. 17-24, 2002.
D.M. Marom et al., "Wavelength-Selective 1×4 Switch for 128 WDM Channels at 50GHz Spacing," 2002 Optical Fiber Communication (OFC) Conference, Postdeadline Papers (FB7), Anaheim, California, Mar. 17-24, 2002.

(Continued)

*Primary Examiner*—Juliana Kang
(74) *Attorney, Agent, or Firm*—John P. O'Banion

(57) ABSTRACT

A 1×$N^2$ wavelength selective switch (WSS) configuration in which switch elements are configured in a way that enables the input or output fibers to be arranged in a two-dimensional (2D) array. By employing 2D arrays of input/output channels, the channel count is increased from N to $N^2$ for wavelength selective switches. In one embodiment, in which the components are arranged as a 2-f imaging system, a one-dimensional (1D) array of mirrors is configured such that each mirror has a dual scanning axis (i.e., each mirror can be scanned in X and Y directions). In another embodiment, in which the components are arranged as a 4-f imaging system, two 1D arrays of mirrors are configured with orthogonal scanning directions. In both embodiments, the number of ports is increased from N to $N^2$.

39 Claims, 6 Drawing Sheets

OTHER PUBLICATIONS

D. Hah et al., "Low Voltage MEMS Analog Micromirror Arrays with Hidden Vertical Comb-Drive Actuators," 2002 Solid-State Sensor and Actuator Workshop, Hilton Head, SC, Jun. 2002.

S. Huang et al., "Open-Loop Operation of MEMES WDM Routers with Analog Micromirror Array," IEEE/LEOS International Conference on Optical MEMS, Lugano, Switzerland, Aug. 20-23, 2002.

* cited by examiner

WAVELENGTH-SELECTIVE 1×N2 SWITCHES WITH TWO-DIMENSIONAL INPUT/OUTPUT FIBER ARRAYS

CROSS-REFERENCE TO RELATED APPLICATIONS

This application claims priority from, and is a 35 U.S.C. § 111(a) continuation of, PCT international application serial number PCT/US03/17043 filed on May 30, 2003 which designates the U.S., incorporated herein by reference in its entirety, and which in turn claims priority from U.S. provisional application Ser. No. 60/402,387 filed on Aug. 8, 2002, incorporated herein by reference in its entirety.

STATEMENT REGARDING FEDERALLY SPONSORED RESEARCH OR DEVELOPMENT

This invention was made with Government support under Grant No. N66001-00-C-8088, awarded by DARPA/SPARWAR. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention pertains generally to wavelength-selective switches (WSS), and more particularly to a 1×N$^2$ WSS that uses a two-dimensional array of input/output fibers whereby the number of output ports are significantly increased.

2. Description of Related Art

Wavelength-selective switches (WSS) that support individual wavelength switching are of great interest for transparent optical networks. Recent advances in WSS technologies have revolutionized optical fiber communication networks. Wavelength-selective switches have received a great deal of attention because their ability to route different wavelength channels independently. For example, Ford et al. proposed the first MEMS (Micro-Electro-Mechanical Systems)—based optical add/drop multiplexer (OADM) using a digital micromirror array (J. E. Ford, V. A. Aksyuk, D. J. Bishop, and J. A. Walker, "Wavelength add-drop switching using tilting micromirrors," J. Lightwave Technology, vol. 17, p. 904–11, 1999, incorporated herein by reference). The use of MEMS micromirrors offers lower insertion loss and faster speed than liquid-crystal-based OADM (J. S. Patel and Y. Silberberg, "Liquid crystal and grating-based multiple-wavelength cross-connect switch," IEEE Photon. Technol. Lett., 7, 514–516 (1995), incorporated herein by reference). This OADM is essentially a 1×1 wavelength-selective switch; however, a multiport wavelength-selective switch can be realized by replacing the digital micromirrors with analog micromirrors and expanding the input/output fibers into a linear array. This is a useful network element because it can be used either as a versatile multiport add-drop multiplexer or as a basic building block for N×N wavelength-selective crossconnect (WSXC).

Several 1×N WSS configurations also have been reported. Examples of such configurations as described in D. M. Marom, et al., "Wavelength-selective 1×4 switch for 128 WDM channels at 50 GHz spacing," 2002 Optical Fiber Communication (OFC) Conference, Postdeadline Papers (FB7), Anaheim, Calif., Mar. 17–24, 2002, FB7, incorporated herein by reference; A. R. Ranalli, B. A. Scott, J. P. Kondis, "Liquid crystal-based wavelength selectable crossconnect," ECOC 1999, incorporated herein by reference; T. Ducellier, et al., "The MWS 1×4: a high performance wavelength switching building block," ECOC 2002, incorporated herein by reference; and S. Huang, J. C. Tsai, D. Hah, H, Toshiyoshi, and M. C. Wu, "Open-loop operation of MEMS WDM routers with analog micromirror array," 2002 IEEE/LEOS Optical MEMS Conf., incorporated herein by reference.

Such switches are basic building blocks for N×N fully non-blocking wavelength-selective optical crossconnect. In current switch designs, however, the port count is limited by optical diffraction. Note that the switches reported to date are generally limited to 1×4, though adding circulators to each port can double the port count.

For example, FIG. 1 schematically illustrates a WDM router 10 implemented with a one-dimensional (1D) analog scanning micromirror array 12. This router can handle multiple spatial and multiple wavelength channels at the same time. The optical beams 14 from input/output fibers are first collimated and then dispersed by a diffraction grating 16. Each wavelength is focused onto a corresponding micromirror 18 in array 12 by a focusing lens 20. The wavelength can be routed independently to any of the fibers by tilting the corresponding micromirror. As can be seen, however, the maximum number of input/output fibers will be limited by optical diffraction for a given number of wavelength channels.

It will be appreciated that larger port count ($\geq 10$) WSS configurations are needed for high capacity networks. The present invention satisfies that need, as well as others, and overcomes limitations in current WSS switch designs.

BRIEF SUMMARY OF THE INVENTION

The present invention comprises a 1×N$^2$ wavelength selective switch (WSS) configuration. In accordance with an aspect of the invention, the input or output fibers are arranged in a two-dimensional (2D) array rather than in a one-dimensional (1D) array.

The present invention provides for a larger number of input or output channels compared to previously developed configurations. By employing 2D arrays of input/output channels, the channel count is increased from N to N$^2$ for wavelength selective switches.

By way of example, and not of limitation, a switch configuration according to the present invention comprises a wavelength dispersive element, at least one focusing lens, and at least one mirror array. In one embodiment, a one-dimensional (1D) array of mirrors is configured such that each mirror has a dual scanning axis (i.e., each mirror can be scanned in X and Y directions). In another embodiment, two 1D arrays of single-axis mirrors are configured with orthogonal scanning directions. In both embodiments, the number of ports is increased from N to $N^2$. In the embodiment using an array of dual-axis mirrors, the switch is configured as a 2-f system. In the embodiment using two arrays of single-axis mirrors, the switch is configured as a 4-f imaging system.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 2 through FIG. 6. It will be appreciated that the apparatus may vary as to configuration and as to details of the parts, and that the method may vary as to the specific steps and sequence, without departing from the basic concepts as disclosed herein.

Figure 1:
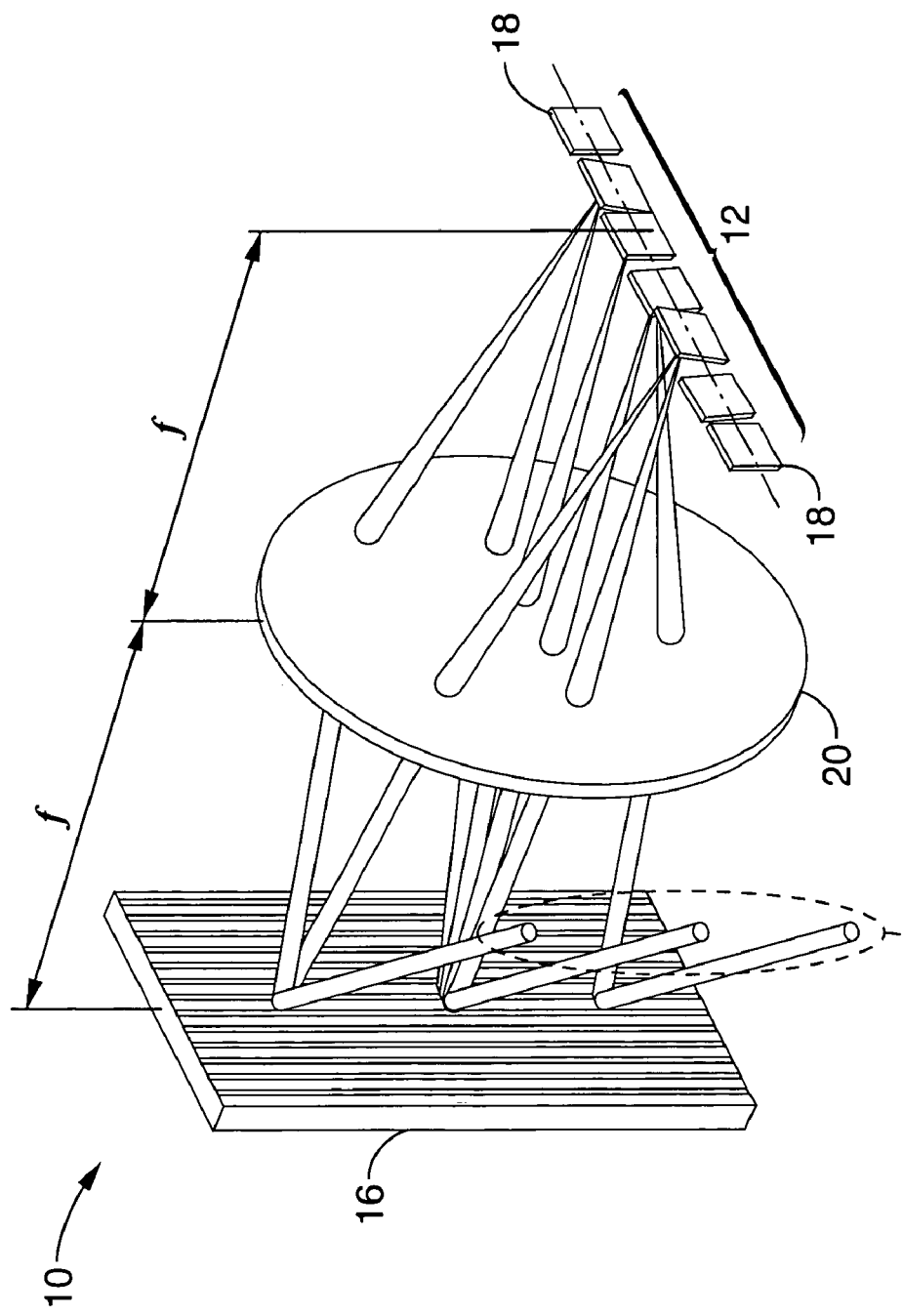
FIG. 1 is schematic perspective view of a 1D optical switch that employs a 1D array of one-axis scanning micromirrors configured to focus optical beams on a 1D array of output fibers according to conventional design.
Figure 2:
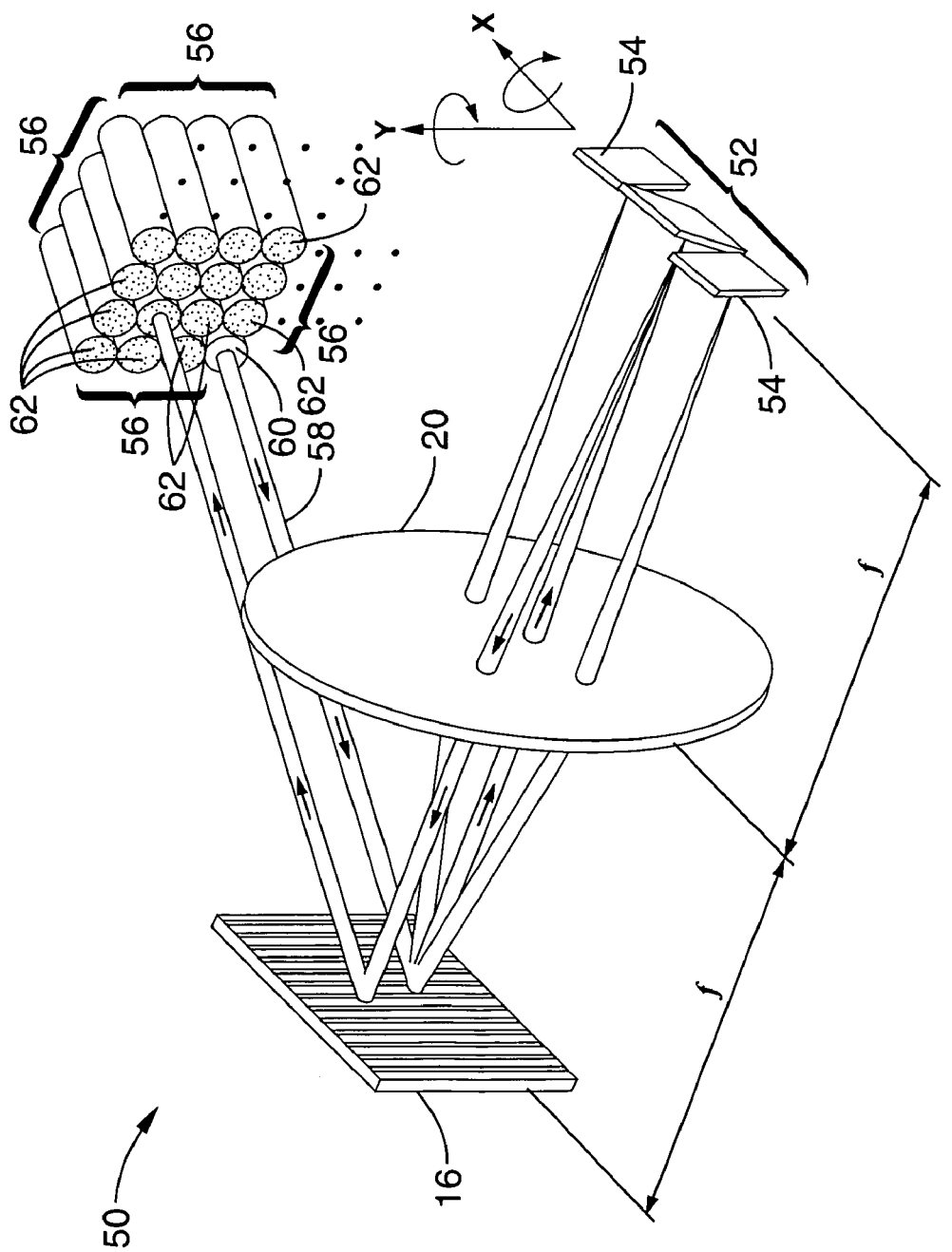
FIG. 2 is a schematic perspective view of an embodiment a 2D optical switch according to the present invention wherein the one-axis micromirrors in FIG. 1 have been replaced with dual-axis micromirrors and the 1D array of output fibers has been replaced with a 2D array of output fibers.

Referring first to FIG. 2, in one embodiment of the invention, a one-dimensional (1D) analog scanning micromirror array such as that shown in FIG. 1 is replaced with a two-dimensional (2D) scanning micromirror array. As can be seen, this embodiment of an optical switch 50 does not require a significant change in the arrangement of the optical components shown in FIG. 1. For example, in the embodiment shown in FIG. 2, mirror array 12 in FIG. 1 has been replaced with a mirror array 52 in which each mirror 54 has a dual scanning axis (i.e., each mirror can be scanned in the X and Y directions). In addition, the present invention employs a 2D output fiber array 56 instead of a 1D output fiber array that would be used with the configuration shown in FIG. 1. As can be seen, in the embodiment shown in FIG. 2, an optical beam 58 can be switched from the input fiber 60 to any of the output fibers 62 in the 2D output fiber array 56. Note that, for purposes of facilitating the discussion herein, input fiber 60 has been illustrated without shading while the remaining fibers are shaded to depict them as output fibers 62. It will be appreciated, however, that the fiber configuration can be rearranged such that the input fiber could be any one of the fibers in the array. In other words, the combination of input fiber 60 and output fibers 62 in array 56 form an overall input/output fiber array.

Those skilled in the art will appreciate that the wavelength dispersive element 16 can be a conventional type grating, such as a diffraction grating. In addition, imaging components such as lenses 20 used as means to focus the optical beams onto the mirrors can be microscopic or macroscopic optical elements, lenslets in combination with bulk lenses, and the like.

It will further be appreciated that the mirror arrays would preferably comprise Micro-Electro-Mechanical Systems (MEMS) micromirror arrays for both size and reliability considerations. However, control of dual-axis micromirrors is more complex than control of single-axis mirrors. Accordingly, in a second embodiment, instead of using an array of dual-axis mirrors, two 1D arrays of single-axis mirrors are configured with orthogonal scanning directions. As can be seen in the optical switch 100 shown in FIG. 3 through FIG. 5, the mirrors 102 in a first 1D array 104 rotate about a first axis and the mirrors 106 in a second 1D array 108 rotate about a second axis that is orthogonal to the first axis.

Figure 3:
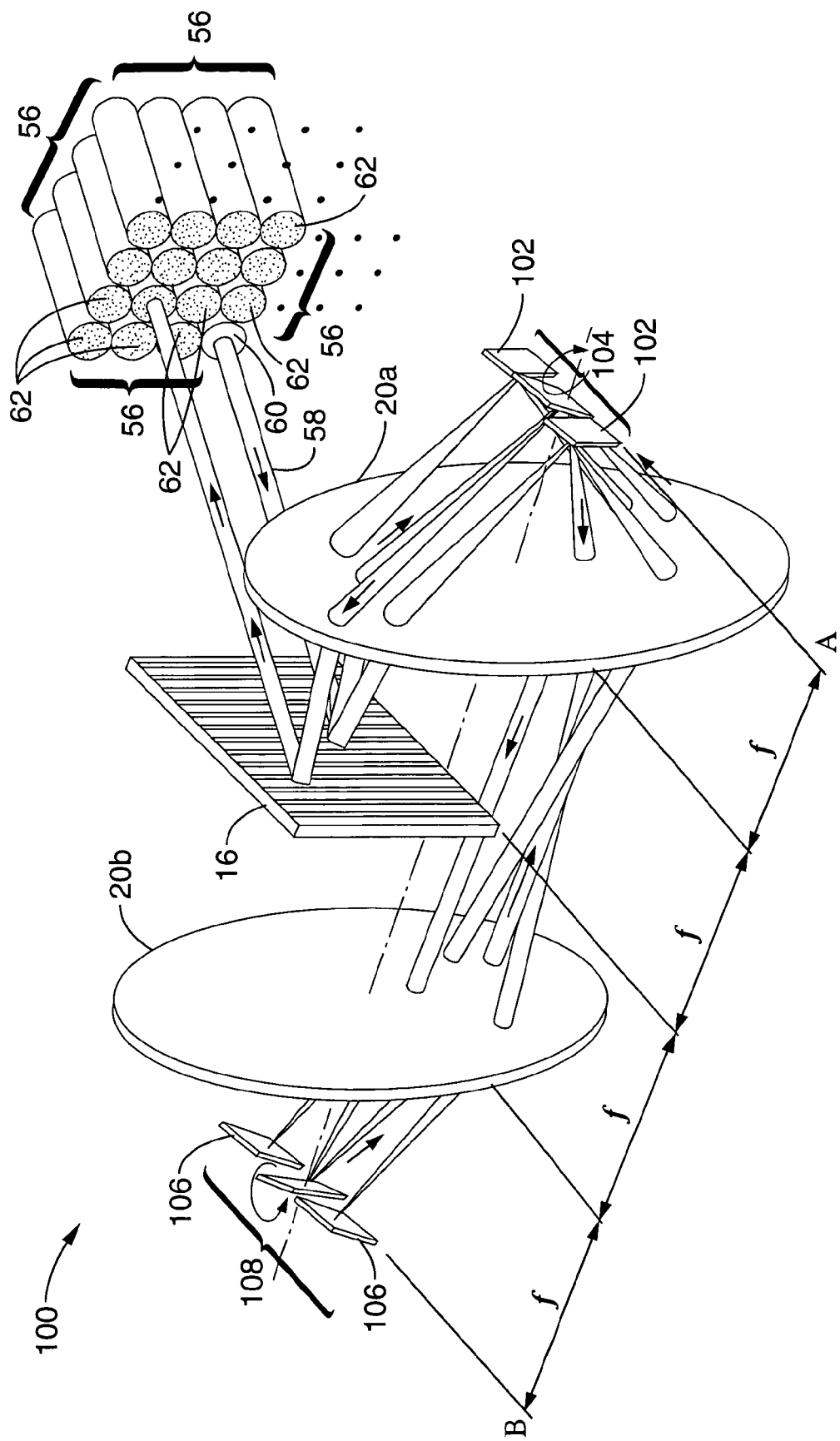
FIG. 3 is a schematic perspective view of a second embodiment of a 2D optical switch according to the present invention wherein the dual-axis micromirror array has been replaced with two 1D arrays of one-axis mirrors configured with orthogonal scanning directions.
Figure 4:
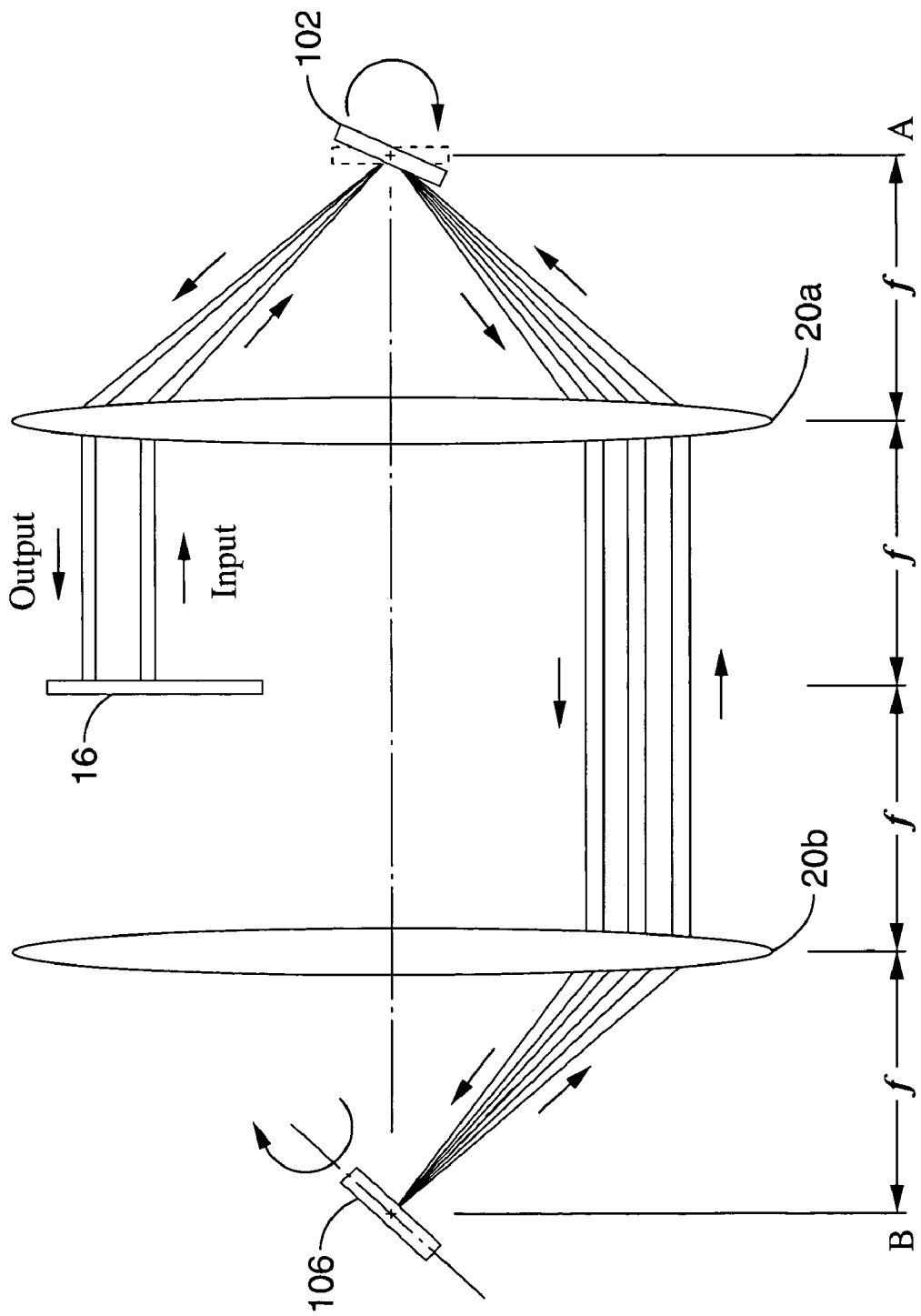
FIG. 4 is a schematic side view of the optical switch shown in FIG. 3.
Figure 5:
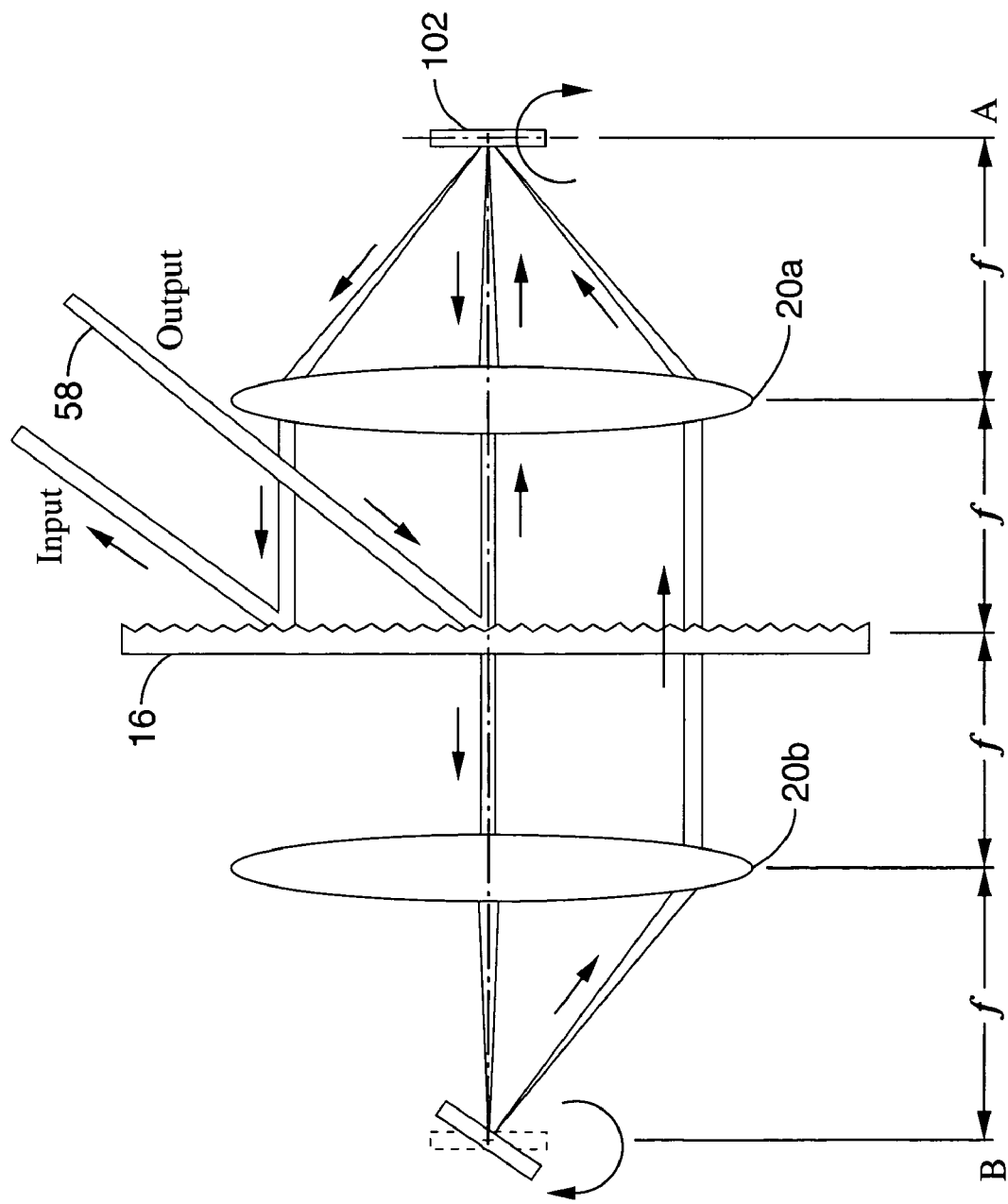
FIG. 5 is a schematic top plan view of the optical switch shown in FIG. 3.

In the optical switch 100 shown in FIG. 3 through FIG. 5, the two 1D arrays 102, 108 implement the 2D beam steering function. The two focusing lenses 20a, 20b are arranged in a 4-f confocal configuration to image the first micromirror array 104 in Plane A to the second micromirror array 108 in Plane B. The grating 16 is inserted between the lenses in the upper half of the system 100. It will be appreciated that, in this embodiment, the axial position of the grating is adjusted such that the projected light spot from the input port is located at the common focus of the two lenses. The 4-f confocal configuration ensures that the optical beam focused on any mirror 102 in the first array 104 is always directed to the corresponding mirror 106 in the second array 108, and vice versa, irrespective of the tilting angle of the mirrors. Thus, each wavelength is steered by two micromirrors in orthogonal directions and directed towards the desired output fiber 62 in the 2D fiber array 56. Since a pair of micromirrors are used to steer the optical beam and the two mirrors scan in orthogonal directions, the optical beam can be guided into any arbitrary fiber in the 2D fiber array. Another benefit of this 4-f configuration is that the optical beam passes through the first array twice. This doubles the deflection of the optical beam in the vertical direction. Therefore, more spatial channels can be supported.

It will be appreciated that the embodiments described above illustrate a 2D output fiber array 56. However, the optical switch can be implemented in either a $1 \times N^2$ configuration where the 2D fiber array is the output array or in a $N^2 \times 1$ configuration where the 2D fiber array is the input array. Therefore, it will also be appreciated that an optical switch according to the present invention comprises at least one input channel and at least one output channel, wherein either the input channel or the output channel comprises a 2D fiber array. It will further be appreciated that an optical beam can be switched from any input fiber to any output fiber.

EXAMPLE 1

A prototype system according to the embodiment shown in FIG. 3 through FIG. 5 was constructed using lenses with 15-cm focal lengths. A channel spacing of 75 GHz was attained with an 1100 grooves/mm grating. The number of wavelength channels was 15, which was limited only by the number of mirrors in the array that could be accommodated on our particular chip. The optical system supported a 3×3 fiber collimator array at the input plane, which was used as a 1×8 wavelength-selective switch with an input collimator located at the center of the array. Discrete collimators were used to simulate the 2D array. The focused beam waist on the micromirror was 30 μm. With a micromirror pitch of 160 μm, the acceptable beam waist can be as large 60 μm. Using this number, the input collimator size can be reduced by two times. Hence, the array size at the input plane can be increased to 5×5, which can be used for a 1×24 wavelength-selective switch. The fiber-to-fiber insertion loss of the system was measured to be 6 dB when the laser beam is coupled back to the input fiber collimator. The temporal response was measured when a square wave was applied to both arrays. The switching time was 150 μsec at the falling edge, and 700 μsec at the rising edge. The extinction ratio was 35 dB. When the laser beam was switched to a fiber channel right below the input collimator, the insertion loss was measured to be 8.6 dB. When switched to a diagonal channel at one of the corners, the insertion loss was measured to be 14 dB. The difference in insertion loss was attributed to the imperfect optical alignment. The spectral response at the input and the diagonal output fibers was measured. Ten of the fifteen wavelength channels were plotted. Switching at 1550 nm was clearly observed.

EXAMPLE 2

A prototype system according to the embodiment shown in FIG. 3 through FIG. 5 was constructed using 1×30 arrays of surface-micromachined analog micromirrors with orthogonal scanning directions. The system was configured with a 50 GHz channel spacing using an 1100 grooves/mm grating. The optical insertion loss was measured to be 12.5 dB, and the extinction ratio was measured to be 36 dB. The switching time was found to be less than 1 msec. Discrete commercial collimators with 2.5 mm beam waist were used due to their availability. If a 2D collimator array is used, a maximum of 4×10=40 spatial channels can be accommodated for the current optical design.

As discussed above, discrete collimators can be used in the embodiments of the invention heretofore described. The examples set forth above relied on the use of discrete collimators to simulate a 2D collimator array. However, the large housings of discrete collimators tend to reduce the practical port count, and the alignment of individual collimators is a cumbersome process. On the other hand, it will be appreciated that a monolithic 2D fiber collimator array can overcome the above disadvantages. Accordingly, referring to FIG. 6, a 1×N² WSS 200 with a monolithic 2D fiber collimator array 202 is illustrated. In this embodiment, each wavelength is steered by two micromirrors in orthogonal directions and directed toward the desired collimator in the 2D array 202. In addition, a telescope 204 having a pair of lenses 206, 208 is employed to expand the optical beams emerging from the 2D fiber collimator array.

EXAMPLE 3

Figure 6:
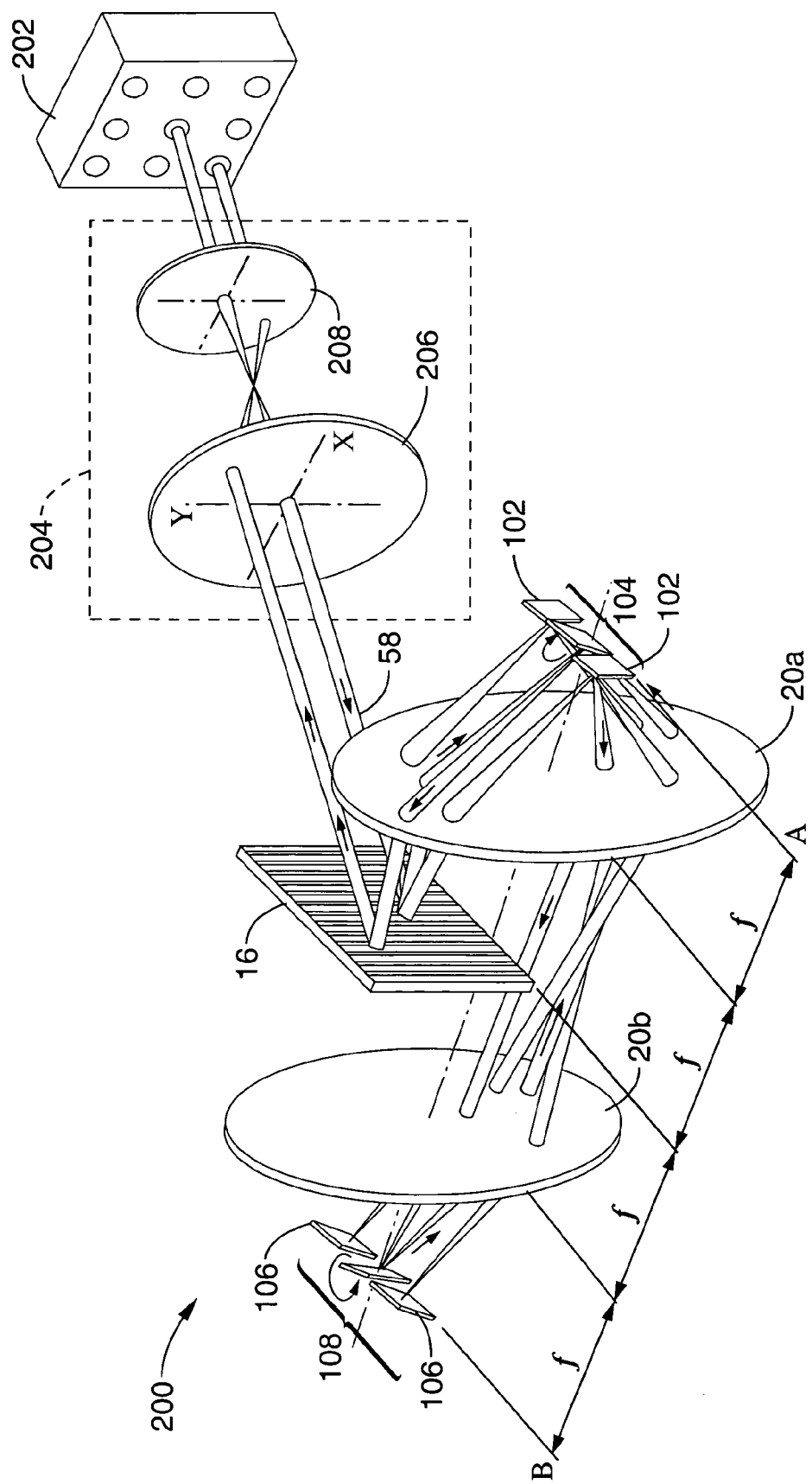
FIG. 6 is schematic perspective view of an alternative embodiment of the optical switch shown in FIG. 3 through FIG. 5 employing an embodiment of an integrated 2D fiber collimator array with a telescope beam expander according to the present invention.

A prototype system was constructed according to the embodiment shown in FIG. 6. A commercial 6×6 fiber collimator array was used in this system, and the pitch of the array was 1 mm with a beam radius of 125 μm. A 6× telescope was used to expand the optical beams before they are spatially dispersed by the grating. The beam expander reduces the optical spot size on the micromirror. A 600-grooves/mm grating and two lenses with 15-cm focal length were selected for this system. In addition, 10 of the 36 (6×6) spatial channels were covered by the effective lens area the system. Therefore, the system functioned as a 1×9 WSS but the port count can be increased by improving the fill factor of the 2D collimator array. The microlens diameter-to-pitch ratio of the collimator array was relatively low (50%). The fiber-to-fiber insertion loss was measured to be 14 dB when the optical beam was coupled back to the input port. When the optical beam was switched to another spatial channel, the insertion loss was measured to be 16.5 dB. The measured insertion loss was found to be higher than our previous results using discrete collimators for two reasons. First, the commercial collimator array was not optimized for the system and the beam spot size was larger than the mirror size, thus resulting in clipping loss. Second, the alignment tolerance is tighter since we cannot adjust angular misalignment of individual collimators. The temporal response was measured when the optical beam was switched from the input port to another output port. The switching time was less than 1 msec. The spectral response of 4 wavelength channels with 160-GHz (1.3 nm) channel spacing was measured (1548.7-nm, 1550-nm, 1551.3-nm, and 1552.6-nm). The 1550-nm channel was switched to the output port, while the other 3 channels were coupled back to the input port. Switching clearly occurred, and it was found that the extinction ratio can be improved by reducing the focused spot size on the device plane.

As can be seen, therefore, an advantage of the present invention over existing practices is that use of a 2D fiber array increases the number of fiber ports from N to $N^2$, where N is the number of input/output ports for a 1D fiber array configuration. Accordingly, the invention facilitates the implementation of multi-port optical add-drop multiplexers with >10 output ports which are desired for dense wavelength division multiplexed (DWDM) networks. By optimizing the mirror and collimator sizes, the port count of the system can be expanded considerably.

Furthermore, it will be appreciated that the invention can achieve these advantages using conventional lenses, gratings, and the like. Additionally, various micromirror and actuator designs can be used for the micromirrors, including, but not limited to, those described in U.S. Pat. No. 6,097,859, incorporated herein by reference, those described in Hah, S. Huang, H. Nguyen, H. Chang, H. Toshiyoshi, and M. C. Wu, "A low voltage, large scan angle MEMS micromirror array with hidden vertical comb-drive actuators for WDM routers," 2002 Optical Fiber Communication (OFC) Conference, Anaheim, Calif., Mar. 17–24, 2002, incorporated herein by reference, and those described in D. Hah, S. Huang, H. Nguyen, H. Chang, J. C. Tsai, and M. C. Wu, "Low voltage MEMS analog micromirror arrays with hidden vertical comb-drive actuators," Solid-State Sensor, Actuator, and Microsystems Workshop, June 2002, p. 11–14, incorporated herein by reference.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An optical switch, comprising:
   a two-dimensional array of optical ports;
   an input port within said two-dimensional array of optical ports configured for communicating an optical beam containing multiple wavelengths;
   a plurality of output ports within said two-dimensional array of optical ports; and
   a first one-dimensional array of single-axis actuated mirrors; and
   a second one-dimensional array of single-axis actuated mirrors configured with a scanning direction that is orthogonal to said first one-dimensional array;
   wherein said first and second one-dimensional arrays of actuated mirrors are configured for switching the optical beam from said input port to an output port in said two-dimensional array of optical ports.

2. An optical switch as recited in claim 1, further comprising at least one imaging component configured for positioning said optical beam onto said first and/or said second array of actuated mirrors.

3. An optical switch as recited in claim 2, wherein at least one imaging component comprises at least one lens.

4. An optical switch as recited in claim 1, further comprising:
   a wavelength dispersive element;
   wherein said wavelength dispersive element is configured for separating at least one wavelength component in said optical beam from at least one other wavelength component in said optical beam; and
   wherein said optical switch is configured for switching said at least one wavelength component from said input port to said output port.

5. An optical switch as recited in claim 1, further comprising means for collimating optical beams in said optical switch.

6. An optical switch as recited in claim 5, wherein said means for collimating optical beams in said optical switch comprises a monolithic two-dimensional collimator array.

7. An optical switch, comprising:
   a two-dimensional array of optical ports;
   an input port within said two-dimensional array of optical ports configured for communicating an optical beam containing multiple wavelengths;
   a plurality of output ports within said two-dimensional array of optical ports;
   a first one-dimensional array of single-axis actuated mirrors;
   a second one-dimensional array of single-axis actuated mirrors configured having a scanning direction orthogonal to said first one-dimensional array; and
   means for positioning said optical beam onto said array of actuated mirrors;
   wherein said first and second one-dimensional arrays of actuated mirrors are configured for switching the optical beam from said input port to an output port in said two-dimensional array of optical ports.

8. An optical switch as recited in claim 7, wherein said means for positioning comprises:
   a first lens; and
   a second lens;
   wherein said first and second lenses and said first and second arrays of actuated mirrors are arranged in a 4-f confocal configuration within said optical switch.

9. An optical switch as recited in claim 7, wherein said means for positioning comprises at least one lens.

10. An optical switch as recited in claim 7, further comprising telescopic means for expanding the optical beams from said two-dimensional array of optical ports.

11. An optical switch as recited in claim 7, further comprising means for collimating optical beams in said optical switch.

12. An optical switch as recited in claim 7, further comprising:
    a wavelength dispersive element;
    wherein said wavelength dispersive element is configured for separating at least one wavelength component in said optical beam from at least one other wavelength component in said optical beam; and
    wherein said optical switch is configured for switching said at least one wavelength component from said input port to said output port.

13. An optical switch as recited in claim 7, further comprising means for collimating optical beams in said optical switch.

14. An optical switch as recited in claim 13, wherein said means for collimating optical beams in said optical switch comprises a monolithic two-dimensional collimator array.

15. An optical switch, comprising:
    a two-dimensional array of optical ports;
    an input port within said two-dimensional array of optical ports configured for communicating an optical beam containing multiple wavelengths;
    a plurality of output ports within said two-dimensional array of optical ports;
    a first array of actuated mirrors;
    a second array of actuated mirrors;
    means for directing said optical beam onto said first and second array of actuated mirrors; and
    means for spatially dispersing wavelengths within said optical beam;
    wherein said first array of mirrors are configured for single-axis rotation about a first axis;
    wherein said second array of mirrors are configured for single-axis rotation about a second axis that is orthogonal to said first axis; and
    wherein said arrays of actuated mirrors are configured for switching an optical beam from said input port through said means for positioning and said means for spatially dispersing to steer desired wavelengths within said optical beam to an output port in said two-dimensional array of output ports.

16. An optical switch as recited in claim 15, wherein said means for directing said optical beam and said means for spatially dispersing wavelengths, are positioned confocally between said first and second arrays of actuated mirrors.

17. An optical switch as recited in claim 16, wherein said means for directing said optical beam comprises:
a first lens; and
a second lens;
wherein said first and second lenses and said first and second arrays of actuated mirrors are arranged in a 4-f confocal configuration within said optical switch.

18. An optical switch as recited in claim 15, wherein said means for directing said optical beam comprises an imaging component configured for positioning said optical beam onto said first array of actuated mirrors.

19. An optical switch as recited in claim 18, wherein said imaging component comprises a lens.

20. An optical switch as recited in claim 15, further comprising an imaging component configured for positioning said optical beam onto said second array of actuated mirrors.

21. An optical switch as recited in claim 20, wherein said imaging component comprises a lens.

22. An optical switch as recited in claim 15, wherein said means for spatially dispersing wavelengths comprises:
a wavelength dispersive element;
wherein said wavelength dispersive element is configured for separating at least one wavelength component in said optical beam from at least one other wavelength component in said optical beam; and
wherein said optical switch is configured for switching said at least one wavelength component from said input port to said output port.

23. An optical switch as recited in claim 22, wherein said means for directing said optical beam comprises:
a first lens positioned between said wavelength dispersive element and said first array of actuated mirrors; and
a second lens positioned between said wavelength dispersive element and said second array of actuated mirrors;
wherein said arrays of actuated mirrors, said lenses and said wavelength dispersive element are arranged in a 4-f confocal configuration within said optical switch.

24. An optical switch as recited in claim 23, wherein said wavelength dispersive element comprises a grating.

25. An optical switch as recited in claim 15, further comprising means for collimating optical beams in said optical switch.

26. An optical switch as recited in claim 25, wherein said means for collimating optical beams in said optical switch comprises a monolithic two-dimensional collimator array.

27. An optical switch, comprising:
a two-dimensional array of optical ports, each of said optical ports configured for communicating multiple wavelength channels;
an input port within said two-dimensional array of optical ports;
an output port within said two-dimensional array of optical ports;
a first one-dimensional array of single-axis actuated mirrors;
a second one-dimensional array of single-axis actuated mirrors configured with a scanning direction that is orthogonal to said first one-dimensional array;
a first lens;
a second lens;
wherein said first and second lens are confocal and configured for positioning said optical beam onto said arrays of actuated mirrors; and
a wavelength dispersive element configured for spatially dispersing the optical wavelengths within an optical beam;
wherein said array of mirrors is configured to switch an optical beam on an input channel to a port in said two-dimensional array of ports.

28. An optical switch as recited in claim 27, wherein said lenses and said wavelength dispersive element are positioned between said first array of actuated mirrors and said second array of actuated mirrors.

29. An optical switch as recited in claim 28, wherein said wavelength dispersive element is positioned intermediate said first lens and said second lens.

30. An optical switch as recited in claim 29:
wherein said first and second mirror arrays are separated in a 4-f confocal arrangement;
wherein said first lens is confocally positioned 1-f from said first mirror array and 3-f from said second mirror array;
wherein said second lens is confocally positioned 3-f from said first mirror array and 1-f from said second mirror array; and
wherein said wavelength dispersive element is confocally positioned 2-f from both said first mirror array and said second mirror array.

31. An optical switch as recited in claim 30:
wherein said 4-f confocal arrangement is configured to direct the optical beam focused on any mirror in said first array to a corresponding mirror in said second array, and to direct the optical beam focused on any mirror in said second array to a corresponding mirror in said first array; and
wherein said optical beams are directed between corresponding mirrors in said first and second mirror arrays without regard to the tilting angle of the mirrors.

32. An optical switch as recited in claim 27, further comprising telescopic means for expanding the optical beams from said two-dimensional array of optical ports.

33. An optical switch as recited in claim 27, wherein said two-dimensional array of optical ports is configured with a pitch of approximately 1 mm.

34. An optical switch as recited in claim 27:
wherein said optical beam has a radius on the order of 125 micrometers;
wherein said telescopic means comprises a telescope with magnification on the order of 6×;
wherein said wavelength dispersive element comprises a grating with groove spacing on the order of approximately 600 grooves per millimeter; and
wherein said first and second lenses have a focal length f on the order of 15 centimeters.

35. An optical switch as recited in claim 27, wherein said two-dimensional array of optical ports is configured as an $N^2$ array of optical ports.

36. An optical switch as recited in claim 27:
wherein said wavelength dispersive element is configured for separating at least one wavelength component in said optical beam from at least one other wavelength component in said optical beam; and
wherein said optical switch is configured for switching said at least one wavelength component from said input port to said output port.

37. An optical switch as recited in claim 31, wherein said arrays of actuated mirrors, said lenses and said wavelength dispersive element are arranged in a 4-f confocal configuration within said optical switch.

38. An optical switch as recited in claim 27, further comprising means for collimating optical beams in said optical switch.

39. An optical switch as recited in claim 38, wherein said means for collimating optical beams in said optical switch comprises a monolithic two-dimensional collimator array.

\* \* \* \* \*